United States Patent [19]

Spradlin et al.

[11] 4,393,085
[45] Jul. 12, 1983

[54] ENZYME DIGESTION FOR A DOG FOOD OF IMPROVED PALATABILITY

[75] Inventors: Joseph E. Spradlin; Jeffrey D. Morgan, both of Bourbonnaise; Allan R. Olson, Ashkun; Joseph P. Howley, Flossmoor, all of Ill.

[73] Assignee: General Foods Corporation, White Plains, N.Y.

[21] Appl. No.: 292,473

[22] Filed: Aug. 13, 1981

[51] Int. Cl.$^3$ .......................... A23K 1/00; A23K 1/18
[52] U.S. Cl. ........................................ 426/28; 426/18; 426/59; 426/805; 426/623; 426/646; 426/656
[58] Field of Search .................. 426/28, 18, 59, 805, 426/623, 656, 646

[56] References Cited

U.S. PATENT DOCUMENTS

| | | | |
|---|---|---|---|
| 3,617,300 | 11/1971 | Borochoff | 426/28 |
| 3,653,908 | 4/1972 | Buck et al. | 426/332 |
| 3,857,968 | 12/1974 | Haas et al. | 426/805 X |
| 3,968,255 | 7/1976 | Haas et al. | 426/656 X |
| 4,045,585 | 8/1977 | Appleman et al. | 426/805 X |
| 4,190,679 | 2/1980 | Coffee et al. | 426/623 X |
| 4,225,630 | 9/1980 | Pitchon | 426/805 X |
| 4,310,558 | 1/1982 | Nahm | 426/623 X |

Primary Examiner—Joseph M. Golian
Attorney, Agent, or Firm—Thomas R. Savoie; Daniel J. Donovan; Joseph T. Harcarik

[57] ABSTRACT

The object of the present invention is to provide an improved process for preparing a dog food comprising farinaceous and meaty ingredients.

This invention recognizes for the first time that the palatability of dog food can be improved when at least a portion of the farinaceous ingredients are subjected to both an amylase and protease enzyme digestion and intermixing an enzymatically modified proteinaceous material to form a reaction slurry mixture. The resulting combined reaction slurry mixture can be incorporated into the dog food by coating it on the surface or admixing it with the other dog food ingredients and thereby incorporating it internally. Preferably, the combined reaction slurry is admixed with the other ingredients to form a plastic mass which is then shaped and expanded by extrusion.

17 Claims, No Drawings

ENZYME DIGESTION FOR A DOG FOOD OF IMPROVED PALATABILITY

TECHNICAL FIELD

The present invention relates to dog foods, and particularly to improving the palatability of dog foods containing farinaceous and proteinaceous materials.

While the development and production of nutritious dog foods is well understood by those skilled in the art, there is a continuing problem of making these food palatable. The attainment of palatability in dog foods is important from at least two standpoints. First, it assures that the dog will consume a sufficient quantity of the food to maintain a healthy existence. Secondly, it enables the use of large amounts of basic food ingredients and by-products from the human food industry. This helps to reduce the cost of human food production by providing a market for the by-products of this industry while at the same time minimizing the demand of the pet food industry for the choicer and more select raw materials which are suitable for human consumption.

BACKGROUND ART

One approach to increasing palatability is through the addition of flavors and flavor-improving materials. For example, in U.S. Pat. No. 3,857,968 to G. J. Haas et al there is disclosed a process for improving the palatability of animal foods such as dog foods based upon a lypolytic and proteolytic enzyme treatment of a mixture of fat and protein. The exact reason for the improvement in palatability is not identified by the patent. It is disclosed that the reaction produces a complex array of reaction products which may be responsible for the improvement.

Amino acids are known to have widely varying aromas and flavors depending upon their type and concentration. And, there is nothing which indicates their inherent attractiveness to dogs. Thus, while U.S. Pat. No. 4,267,195 by J. Boudreau et al discloses that L-proline, L-cysteine, L-histidine, and L-lysine are taste active in the dog, there is an apparent need to balance the level depending upon the particular composition of the dog food.

A more general reference to the flavorful effect of amino acids is made in U.S. Pat. No. 3,653,908 to Buck et al which discloses an intermediate moisture animal food especially formulated for cats. While the reference indicates that acidic or enzymatic digestion of the food liberates flavorful amino acids, it is apparent from the conditions of processing that various reaction products of reducing sugars and amino acids are produced.

Further indicative of the effect of proteolytic digestion of proteinaceous ingredients of dog foods, is copending U.S. patent application Ser. No. 91,225 filed in the names of Franzen et al on Nov. 5, 1979. Therein, it is disclosed that an enzyme selected from the group consisting of ficin, trypsin, bromelain, pepsin, and papain produces a reaction mixture which, when combined with the other ingredients of a dog food, increases the overall palatability of the food.

It is also known that various sugars improve the palatability of dog foods. For example, U.S. Pat. No. 3,617,300 to Borochoff et al indicates that dextrose can improve the palatability of dog foods. According to the disclosed process, the starch content of a solid dog food is at least partially enzymatically converted to glucose by alpha-amylase and amyloglucosidase directly in the solid dog food. It was found that the combination of these two enzymes permitted the reaction to occur without adversely affecting the solid character of the dog food. In addition to the preparation of dextrose in situ such as by Borochoff et al it has been known for even longer periods of time to directly employ dextrose syrups which were prepared by enzymatically digesting corn apart from the other components of a dog food.

Thus, while progress has been made in recent years through the development of a variety of dog food palatants, there is a need for additional procedures and products which will yet further improve palatability.

DISCLOSURE OF INVENTION

In accordance with the present invention, an improved process for preparing a nutritionally-balanced dog food comprising fat, protein, vitamins and minerals, and the improved product of that process are provided. The essence of the present invention requires a farinaceous component of pet food to be treated with both protease and amylase enzymes to improve its palatability. The product provided by this process is significantly improved over the same dog food formulation not treated in accordance with the invention.

The term "palatability" is broad and encompasses all of the various properties of dog foods which are sensed by the consuming animal and determine the overall acceptability of the food. Among these properties are texture, taste and aroma. It is believed that the present invention increases palatability as a whole, primarily through improving the taste of the food. However, in the embodiments of the invention wherein the reaction product is incorporated into the dog food by admixing uniformly prior to shaping, textural modifications of the dog food may be apparent. It is not known to what extent, if any, these textural changes by themselves play.

The process of the invention can be employed to improve the palatability of virtually any dog food which contains at least one farinaceous component nd one proteinaceous material. Thus, the process can be employed in the preparation of dry, intermediate moisture, or canned dog foods. The dry dog foods can contain as much 10% moisture without the need for high levels of antimicrobial agents. Dry dog foods typically have moisture contents of from about 8 to about 9% and usually have a dry, crunchy texture. Some dog foods characterized as dry, but have moisture contents up to about 15% by weight and show a soft texture, in part due to the additional water and in part due to the plasticizing character of added agents, such as glycerol and propanediol. The intermediate-moisture foods are typically defined as those having moisture contents of above about 15% and less than 50%, and typically will have a soft texture with moisture content of less than about 30%. The canned dog foods will have moisture contents above 50%, and typically above 70%.

Typical of the dry crunchy dog foods are those disclosed in U.S. Pat. No. 3,119,691 to Ludington et al and the dry crunchy portion of the dual textured food taught in U.S. Pat. No. 4,190,679 to Coffee et al. Disclosed in both of these patents are dry crunchy dog foods having an expanded structure. Both of these dry foods are prepared by admixing proteinaceous and farinaceous components, and extruding the admixture under conditions of temperature and pressure to cause expansion of the product as its exits the extruder.

Typical of the soft dry dog foods which can be improved according to the present invention are those described in U.S. Pat. No. 3,959,511 to Balaz et al. The product described therein has a moisture content of less than 15%, yet has a soft texture. A product with a slightly higher moisture content and a resilient meat-like character is described in the above identified Coffee et al patent. The resilient, meat-like character of the soft portion of the dog food described by Coffee et al is prepared in a manner similar to that for the dry portion described therein. Significant differences, however, reside in the proportion of the ingredients, the use of plasticizing humectants, the moisture content, and the achievement of a fibrous external appearance. The two distinct portons of Coffee et al are prepared to maintain a sharp textural contrast throughout extended periods of storage. Because both types of pieces can be improved according to the present invention, the entire dual-textured pet food described by Coffee et al can be improved or either portion of it can be improved for utilization within that type of product or independently.

Typical of the more conventional intermediate-moisture dog foods which can be improved in palatability according to the present invention are those disclosed in U.S. Pat. No. 3,202,514 to Burgess et al. According to that disclosure, proteinaceous meaty materials are cooked with stabilizing solutes in a first stage and then with the other added pet food materials, which can include farinaceous components, in a second stage prior to shaping and packaging. Also susceptible to improvement according to the invention is the dog food described in U.S. Pat. No. 3,745,021 to Van Middlesworth et al which describes an expanded intermediate-moisture pet food product.

An improvement on the process described by Burgess et al is disclosed in U.S. Pat. No. 4,212,894 to Franzen et al. According to that procedure, proteinaceous meaty materials are processed to prepare a pumpable slurry of fresh, uncooked meaty material in a solution containing sufficient preservative to maintain the meat free from microbial spoilage for a period of at least 5 days. The slurry is held at a temperature effective to maintain homogeneity until needed for processing. It is then pasteurized, shaped with any additional ingredients, and packaged. The process of this invention is particularly well adapted to use with slurries of the type described by Franzen et al. Upon completion of the enzymatic reactions according to the present invention, the slurries containing proteinaceous and farinaceous materials remain pumpable and can be stabilized according to the teachings of Franzen et al, thereby providing the advantages not only of the present invention but also of Franzen et al.

Exemplary of the canned dog food products which can be processed in accordance with the present invention are those which contain meat balls comprising both proteinaceous meaty and farinaceous materials. Typically, the mixture of proteinaceous meaty and farinaceous materials is shaped, cooked to heat set the shape, and then packaged in gravy. The method of the invention is carried out in the same manner for dog foods of this type as would be for those of dry and intermediate moisture variety.

Accordingly, it can be seen that the present invention will be fully disclosed to those of ordinary skill in the art by describing it in detail with regard to any one of these product forms. Thus, the invention is described below for the exemplary case of intermediate-moisture products, but the teachings are fully applicable to dry and canned products.

While not limited to any particular type of process or product, those skilled in the art recognize that nutrition is of paramount importance. It is important that each dog food be nutritionally complete. Where this is done, it is not necessary for the dog owner to balance the quantities of different foods. Thus, the nutritional intake of the dog is assured so long as it intakes a minimum amount of food. Nutritionally-balanced foods will contain protein, carbohydrates, fats, vitamins and minerals in amounts established by feeding tests to be sufficient for proper growth and maintenance.

A preferred product of the invention will meet the nutritional requirements as set forth in Handbook Number 8, entitled, Nutrient Requirement of Dogs, which is published and amended by the National Research Council of the National Academy of Sciences.

The preparation of intermediate-moisture dog foods has become well established since the invention of Burgess et al described in U.S. Pat. No. 3,202,514. The present invention will be described below with specific reference to intermediate-moisture foods, but of the type more specifically described in Coffee et al, U.S. Pat. No. 4,190,679. The disclosures of both of these references are hereby incorporated by reference in their entireties so that the detail of processing set forth therein need not be repeated here.

To be sure that the dog does take a minimum amount of food over a period of time, it is essential that the food be palatable. The nutritionally-balanced dog foods prepared according to the present invention will comprise from 20% to 80% farinaceous ingredients and from 20% to 80% proteinaceous ingredients. They are preferably prepared by expansion from an extruder to obtain a porous texture; however, they can be shaped by other conventional means to provide an unexpanded product or one which is texturized in other known ways. While the products can be dried to a moisture content of less than 10% to provide either a soft or a crunchy texture depending upon the use of various plasticizers such as polyhydric alcohols or other texture-modifying ingredients, the following description will be centered about a product having a moisture content within the range of from about 12 to about 20%.

Typically, the total amount of farinaceous ingredients based on the weight of the total dog food is between about 20% and about 80%, preferably between about 35% and about 75%, by weight of the total food. Among the farinaceous materials which can be employed according to this invention are wheat, corn, barley, oats, etc. in their usual milling forms and derivatives. These terms are meant to encompass all of those varieties typically employed in animal food compositions as are described in the official publication of the Association of American Feed Control Officials, Incorporated.

Although the farinaceous ingredients can be treated individually, it is desired to employ a blend of farinaceous materials, typically corn and wheat. One desirable blend would be wheat and corn at a weight ratio of within the range of from about 4:1 to about 3:2. It has been discovered that at this particular preferred blending of farinaceous ingredients, higher than expected palatability is derived than when these individual ingredients are separately treated and then combined. These ratios require the wheat to be present from 60-80% and the corn to be present from 20-40% by weight on a solids basis of the farinaceous ingredients to be enzyme treated.

The proteinaceous materials should provide good quality protein from both the nutritional and functional standpoints. Thus, where a resilient meat-like texture is required, the proteins employed should have the ability to form a chewy, resilient, meat-like texture under the processing conditions employed.

Suitable as proteinaceous materials according to this invention are proteinaceous meaty materials and vegetable protein sources, as well as, if required, ration-balancing proteins. The term "proteinaceous meaty material" refers to the group consisting of meat, meat by-products and meat meal as well as mixtures of these. The term "meat" is understood to apply not only to the flesh of cattle, swine, sheep and goats, but also other mammals, poultry and fish. The term "meat by-products" is intended to refer to those non-rendered parts of the carcass of slaughtered animals including but not restricted to mammals, poultry and the like and including such constituents as are embraced by the term "meat by-products" in the Definitions of Feed Ingredients published by the Association of American Feed Control Officials, Incorporated. Likewise, the term "meat meal" refers to the finely-ground, dry, rendered residue from animal tissues including those dried residues which may contain bone, and those embraced by the term in the aforesaid official definitions of the Association of American Feed Control Officials, Incorporated. Indeed, the terms "meat", "meat by-products", and "meat meal" are understood to apply to all of those animal, poultry and marine products defined by said Association.

The term "vegetable protein source or concentrate" applies to oil seeds and legumes; as well as the oil-expressed or extracted meals and cakes and protein isolates and concentrates thereof recovered by known procedures including acid or alkali digestion and precipitation; typical of such vegetable protein sources are soybeans, soybean meal, cotton seed meal, alfalfa protein, peanuts, peanut meal, etc., all of which terms are well understood and similarly defined by said Association.

The term "ration-balancing protein supplement" is intended principally to refer to milk products as defined by said Association and hence includes such additives as dried buttermilk, dried skimmed milk, dried whole whey, casein and cheese rind. It also includes yeast as that term is defined by said Association and hence refers to such materials as distillers' dried yeast, primary dried yeast, irradiated dried yeast, brewers dried yeast and torula dried yeast. However, the term protein supplements is not to be understood as restricted to the aforesaid definition and includes such things as single cell protein and the like.

While economy products containing no fresh meat are within the scope of this invention, the product will preferably contain at least 10%, but no more than about 25% of fresh meat. The total weight of proteinaceous ingredients will preferably comprise from 25% to 55% of the total product weight. The protein in addition to the proteinaceous meaty material will be provided by a vegetable protein source or concentrate or a ration-balancing protein supplement. Typically, soybean meal with a 44% protein content is employed in an amount of greater than about 10% and up to about 40% of the total composition. Preferably, soybean meal or other like protein source is employed in an amount of from 12% to about 25% of the weight of the total composition.

In addition to these materials, the preferred dog food formulations will also contain vitamin and mineral supplements necessary to provide balanced nutrition. Additionally, due to the relatively high moisture contents of these foods as opposed to dry foods, and the incapability of most of the noted osmotic agents to inhibit all microbial growth, effective levels of antimycotic agents such as potassium sorbate are desirably employed to assure stability against microbial growth.

The type of processing disclosed by Coffee et al is modified according to the present invention to include a sequence of steps wherein at least a portion of the farinaceous material is digested with both an amylase and proteolytic enzymes and a portion of the proteinaceous material is digested with a proteolytic enzyme. A preferred process modification comprises at least a portion of farinaceous material being digested with an amylase enzyme and a portion of the proteinaceous material then being digested with a proteolytic enzyme in the presence of the farinaceous reaction mixture. This process is preferred because processing control will be fascilitated in determining reaction conditions. The broader aspect of this invention employs three enzyme reactions—amylase and proteolytic enzyme reactions on the farinaceous ingredients and proteolytic enzyme reaction on the proteinaceous ingredients. The preferred method employs two enzyme reactions—amylase enzyme reaction on the farinaceous ingredients and proteolytic enzyme reaction on the combined farinaceous and proteinaceous ingredients.

Although less preferred, another embodiment of this invention comprises at least a portion of the farinaceous material being combined with a portion of the proteinaceous meaty material and the digested with a proteolytic and an amylase enzyme. This aspect of the invention is less preferred because the proteinaceous meaty material, specifically the meat meal contains enzyme inhibitors which retards enzyme digestion. This procedure will usually require larger quantities of enzymes and altered digestion times to overcome the inhibitors naturally present. But this less preferred method would result in a dog food which is more palatable than when the farinaceous and proteinaceous meaty materials are treated separately and then combined.

The reaction mixture is thereafter incorporated into the dog food in any manner and amount effective to improve the overall palatability of the dog food. Typically, this will be done by admixing it with the other ingredients prior to shaping the food products so that it is uniformly admixed throughout the entire product. Alternatively, it can be applied as a coating to the surface of the food. The following description sets forth a preferred manner for preparing the combined reaction mixture wherein it is incorporated by admixing it with the other ingredients to provide a uniform plastic mass which is then shaped and expanded by extrusion.

The principal finding according to the present invention is that when the farinaceous ingredients are subjected to both an amylase and proteolytic enzyme digestion, intermixed with an enzymatically modified proteinaceous meaty material to form a dog food, the degree of improvement of the palatability of the final food is greater than where the farinaceous material is subjected to only an amylase digestion which is then intermixed with an enzymatically modified proteinaceous meaty material to form a dog food.

In general, the process of this invention will involve preparing a farinaceous slurry comprising water and farinaceous material; forming a farinaceous reaction product by treating the farinaceous material in the farinaceous slurry with amylase and protease enzymes under conditions effective to convert at least a portion of the farinaceous material to a mixture of oligosaccharides ranging in size from 1 to 10 monomer units; preparing a proteinaceous slurry comprising water and proteinaceous material; forming a proteinaceous reaction product by treating the proteinaceous material in the proteinaceous slurry with protease enzymes under conditions effective to convert at least a portion of the proteinaceous material to peptides ranging in size from 2 to 300 monomer units; incorporating the farinaceous and proteinaceous reaction products into a dog food in an amount effective to provide a significant increase in the palatability of the dog food to dogs. More preferrable a portion of the proteinaceous material is converted into peptides ranging in size from 2 to 50 monomer units.

A preferred process comprises preparing a farinaceous slurry comprising water and farinaceous material; forming a farinaceous reaction product by treating the farinaceous material in the farinaceous slurry with amylase enzyme under conditions effective to convert at least a portion of the farinaceous material to a mixture of oligosaccharide, ranging in size from 1 to 10 monomer units; admixing proteinaceous material with said farinaceous slurry to prepare a combined slurry; forming a reaction product by treating the combined slurry with proteolytic enzyme under conditions effective to convert at least a portion of the proteinaceous material to peptides ranging in size from 2 to 300 monomer units, and incorporating the reaction product of the combined slurry into a dog food in an amount effective to provide a significant increase in the palatability of the dog food to dogs. More preferrably a portion of the proteinaceous material is converted into peptides ranging in size from 2 to 50 monomer units.

A less preferred process comprises preparing a slurry comprising water farinaceous material, and proteinaceous materials; forming a reaction product by treating the said slurry with amylase and protease enzymes under conditions effective to convert at least a portion of the farinaceous material to a mixture of oligosaccharrides ranging in size from 1 to 10 monomer units and the proteinaceous material to a mixture of peptides ranging in size from 2 to 300 monomer units, and incorporating the reaction product of the combined slurry into a dog food in an amount effective to provide a significant increase in the palatability of the dog food to dogs. More preferrably, a point of the proteinaceous material is converted into peptides ranging in size from 2 to 50 monomer units.

The farinaceous material employed in the slurry can be any of those which are employed in the dog food composition itself, or, if desired, can be a material different than those comprising the major proportion of the farinaceous ingredients. Typically, the farinaceous material treated will amount to from about 5% to about 25% of the total weight of the farinaceous ingredients employed in the dog food. The exact amount will depend as much upon economics as it will upon the desired degree of improvement of the product. Of the farinaceous materials which can be employed, corn and wheat, preferably in their whole ground form, are the most preferred. Corn is a preferred farinaceous material and can be employed alone or in combination with wheat. The combination of wheat and corn is desirable because the wheat contains beta-amylase which might further enhance the reaction.

The slurry for enzymatically reacting the farinaceous material will typically contain from about 30% to about 70% water. The amount of water should be kept to the lowest level consistent with good reaction rate and flowability of the product of the reaction so that the material entering the extruder does not have an excessively high moisture content. It is, of course, possible to employ higher quantities of water and provide for drying of the slurry or final product at some point further along in the process. For example, where a high moisture content is employed in the slurry and the slurry is then admixed with the other dog food ingredients in a preconditioning step, the application of heat during preconditioning could dry the ingredients if that were required.

The amylase enzyme employed according to the present invention should be added in an amount which is effective to convert at least a portion of the farinaceous material to a mixture of oligosaccharrides ranging in size from 1 to 10 monomer units. To provide reproducibility and process control, it is desirable to employ enzymes which are heat labile, thereby permitting them to be inactivated by simply heating them to a temperature effective for that purpose. Among the suitable enzymes are alpha amylase, derived from plants, animals or microorganisms. Preferably a non heat stable bacterial alpha-amylase and fungal alpha-amylase are employed in about equal amounts and combination.

Alpha-amylases randomly attack the alpha 1-4 bonds in a starch or dextrin molecule, resulting in the fragmentation of both linear and branched fragments of starch, i.e., dextrinization. Fungal alpha-amylase primarily converts linear glucose chains to maltose units as the final product. If sufficient time is allotted, under certain conditions, alpha-amylase alone can be made to convert linear glucose chains mostly to a mixture of maltose and dextrose, and branched fragments to a mixture of maltose, dextrose and panose. The panose is a trisaccharide containing 1-6 linkages and, therefore, cannot be broken by the alpha-amylase. Thus, where both enzymes are employed in combination, as preferred, the bacterial alpha-amylase acts to rapidly break up the starch into dextrins and oligosaccharides, and the fungal alpha-amylase proceeds to split off individual maltose molecules from the non-reducing ends of these reaction products.

The exact reaction conditions for the enzymatic reaction will vary depending upon the particular type of enzyme and its source. Typically, however, it is preferred to select enzymes which react rapidly at temperatures within the range of from about 100° F. to about 250° F., preferably within the range of from about 110° to 170° F. Employing enzymes which react within these temperature ranges will provide an efficient utilization of the heat of the reaction slurry when mixed with the remaining ingredients of the food.

As with the temperature, the pH will be dependent upon the particular type and source of enzyme; and, the enzymes should be selected to react effectively at pH conditions typical for the farinaceous ingredients involved, namely a pH within the preferred range of from about 3 to about 7.

It is preferred to complete the reaction as rapidly as possible to minimize the size of the reactor and the quantity of the heat required for the process. The reaction time is, however, dependent upon the other factors which control the rate of reaction. Within these constraints, reaction periods of from about 10 minutes to about 4 hours have been found practical.

While it is desired to standardize a given reaction so that reaction for a given period of time will reproducibly yield the same degree of reaction, it is still necessary to check the reaction progress from time to time. According to one preferred embodiment of the invention, the reaction will be run sufficiently to reduce the viscosity to 50% of the original viscosity. More preferably the reaction is conducted until the viscosity is reduced to 25% of the original viscosity. Most preferably, for ease of processing, the slurry is reduced to 10% of its original viscosity. Using this standard, it is preferable to employ sufficient enzyme to provide generation of desired monomer units and a reduction in the slurry viscosity within the processing time desired.

The prior art as represented by Borochoff et al, teach that in the manufacture of a pet food based upon amylaceous products, enzymes which are essentially free of protease and lipase are desireable. The broader aspect of the present invention departs from the prior art by subjecting the farinaceous ingredients to the enzymatic action of both amylolytic and proteolytic digestion. Whereas the amylolytic digestion of farinaceous ingredients produce complex oligosaccharides, the additional proteolytic digestion of the farinaceous ingredients results in significant improved palatability.

One embodiment of the present invention combines the farinaceous ingredients that have been enzymatically modified with a partial enzymatic digestion of proteinaceous material to form a pet food. It is a further departure from the prior art to combine both an enzymatically modified farinaceous material with an enzymatically modified proteinaceous material.

The preferred embodiment further departs from the prior art by carrying out a partial proteolytic digestion of proteinaceous meaty material in the presence of the farinaceous enzymatic reaction slurry. A less preferred process of the present invention departs from the prior art by combining the farinaceous and proteinaceous ingredients along with water to form a slurry and subjecting it to the enzymatic action of amylase and protease.

The proteinaceous material can be any of those incorporated as part of the dog food as a whole, or can be one especially selected for use in the enzymatic digestion. Preferably, the proteinaceous meaty material will comprise at least 10% of the total weight of the ingredients contained in the dog food, and most preferably will comprise from about 25% to about 55% of the total weight of proteinaceous ingredients. And, it is also preferred to subject at least a major proportion of the proteinaceous meaty material ingredients to this enzymatic reaction. Typically, the entire quantity of proteinaceous meaty material added to the dog food is added to the reaction slurry.

Any proteolytic enzyme derived from plants, animals or microorganisms can be employed which is capable of providing the improvement in palatability. The preferred plant proteases are bromolein and papain. The preferred animal enzymes are trypsin and pepsin. The preferred microorganism enzymes are from bacillus species. While the degree of reaction is dependent upon a number of factors, the proteolytic enzyme will typically be employed in an amount effective to provide generation of desired polypeptides and a reduction in the slurry viscosity to 50% of its original viscosity within the processing time desired.

The various proteolytic enzymes come in a wide variety of commercial forms, including dry, purified enzymes; enzymes supported on various soluble and insoluble carriers; and enzyme solutions of varying strengths. For ease of handling, especially in view of the effect of these materials on body tissues, we prefer to employ the enzyme in the form of a liquid solution.

The proteinaceous materials are prepared for addition into the slurry by grinding or comminuting according to known techniques. Typically, the meat and meaty by-products will be reduced by grinding such as in an Urschel Comitrol or a Seydelmann bowl chopper. Typically, the proteinaceous meaty materials processed in this manner show a majority of the meaty particles to be no longer than 0.25 to 0.35 inch in major dimension. The meat meal component employed can be of standard commercial particle size. Depending upon the requirements of a particular process, it will, of course, be possible to employ meaty material particles of larger or smaller sizes.

Further added to the farinaceous reaction slurry where a soft, meat-like product is ultimately desired, are the various liquid humectants and osmotic agents such as 1,2-propanediol, glycerol and the like. The various materials should be selected based on their contribution to enhancing the flowability of the reaction slurry and their promoting or inhibiting effect upon the rate of reaction.

While the reaction of the proteinaceous materials with the proteolytic enzymes may be a distinct enzyme digestion from that of the reaction of the farinaceous ingredients with the amylase enzyme in the broadest aspect of this invention, the typical reaction conditions, in terms of reaction temperature, pH, and time have been found to be about the same. In the preferred part of this invention it is desired that the conditions for the reaction with the proteolytic enzyme of the combined slurry of amylolytic treated farinaceous ingredients and proteinaceous meaty materials having no enzyme treatment be modified at least as to time and by addition of the proteinaceous meaty material and the proteolytic enzymes in stages. Preferably, the proteinaceous meaty material and the proteolytic enzyme will be added in at least two approximately equal portions. This staged addition provides several advantages: (1) it is possible to maintain the slurry viscosity at a uniformly-flowable level, and (2) the contamination and inactivation of the proteolytic enzyme by heavy metals or other materials within the reaction slurry is prevented from occurring all at once. Thus, a more uniform reaction is achieved and a minimum of agitation energy is required.

To aid in obtaining the desired soft, resilient texture and to provide a controlled water activity in the product, a plasticizing polyhydric alcohol is employed at a level of at least 2% up to 15%, but preferably from greater than 5%, up to 9%. Suitable for use as the plasticizing agent are any of the normally-liquid, edible di-, or tri-hydric alcohols or sugar alcohols or other polyhydric alcohols effective for this purpose. Typical among these are 1,2-propanediol, 1,3-butanediol, glycerol, and mixtures of these. It has been found that due to its highly effective plasticizing effect, glycerol is a preferred material.

In addition to the plasticizing polyol, an intermediate-moisture formulation will also typically contain sufficient other materials capable of arresting microbial growth in the composition. Among these are the low molecular weight materials capable of providing strong osmotic pressure effects, of the type taught by Burgess et al in U.S. Pat. No. 3,202,514. This Burgess et al patent is, therefore, incorporated by reference. Of these, sugars and salts are the most preferred. Sugars such as corn syrups and sucrose, and salts such as sodium chloride are the preferred water activity, $a_w$, lowering materials. High fructose corn syrups and those having dextrose equivalent, DE, values of from about 30 to 75 are especially desired ingredients because they not only have an $a_w$ lowering effect, but they also provide a degree of palatability desired by dogs and help to maintain product plasticity. This formulation will preferably include from about 4% to about 15% corn syrup, based on the weight of the total composition including moisture.

Substantially, all of the ingredients, admixed to the extent indicated above, are preferably combined and subjected to a forming operation. A preferred forming operation includes plasticization and shaping by a screw-fed extruder. In one preferred processing arrangement, substantially all of the ingredients as prepared to the extent indicated above, except for a major portion of the corn, are mixed in a suitable mixing device, such as a ribbon blender and then fed into a steam-jacketted preconditioning chamber wherein the proteinaceous and farinaceous materials which are not part of the combined slurry are moistened, and heated. The starch of the farinaceous material is partially gelatinized. The moisture level within the preconditioner should be controlled to within the level of from about 20% to about 50% to assure proper expansion and the desired final moisture content. A residence time of about 0.25 to 2 minutes is sufficient to moisten and begin cooking the mixture which will achieve a temperature of from about 100° F. to about 190° F. upon exit. More preferably the mixture will achieve a temperature from about 110° F. to 180° F. The steam jacket is preferably heated with steam at a pressure of from about 20 to about 80 psig, preferably about 60 psig.

From the preconditioner, the materials treated therein are fed to a screw-fed extrusion device such as an Anderson expander or a Wenger cooker-extruder wherein they are uniformly admixed with the major amount of the corn which was withheld from preconditioning. The formulation is finally cooked and plasticized in the extruder wherein it is heated and agitated under pressure. The formulation will attain a temperature of from about 250° F. to about 350° F., preferably from 280° F. to 315° F. within the extruder while being subjected to pressures of above 100 psig. This plasticization prepares the material for providing a soft, resilient texture upon extrusion and heats the material to such a degree under the requisite pressure to assure expansion of the formulation upon exiting the extruder. The pressure drop upon exiting the extruder should be at least about 100 psig. Formulations having lower moisture contents will need to be subjected to higher pressures within this range, and higher moisture formulations will require the lower pressures within this range.

An ideal degree of expansion provides about 1.75 to 2.25 times expansion based on the diameter of the extrudate as compared to the diameter of the die orifice from which it is expressed, with acceptable degrees of expansion providing an extrudate being from about 1.50 to 2.75 times the diameter of the orifice. The extrusion conditions will be varied as required to obtain the desired degree of expansion.

The product is preferably severed as it issues from an orifice in the die plate at the end of the extruder. By spacing the cutting blade a small distance from the die face, a pleasing, irregularly-shaped chunk can be obtained due to a ripping action caused by this arrangement. Preferably, the blade is spaced from about 1/32 inch to about ⅜ inch from the die plate. The chucks formed in this manner show a moderately expanded, meat-like interior with a substantially-continuous, fibrous and highly-irregular surface. When extruded and cut in the preferred manner, the product shows a bulk density of from about 18 to 28 pounds per cubic foot, and is preferably from about 22 to 26 pounds per cubic foot, these densities being preferred to obtain the desired fibrous, resilient, meaty texture and product appearance.

While the dog food at this point will provide a desirable animal ration, a coating of a palatability improving material can be applied. Coatings of beef tallow, sprayed on in an amount of from about 2% to about 8% based on the weight of the pet food, and have proved desirable. Likewise, other coatings such as meat meal, meat flavors, gravy formers, and the like can be applied.

According to a preferred embodiment of the invention, a soft, meaty portion is prepared in general accordance with the above description and is then combined with dry crunchy portion which is processed in essentially the same manner except that it may not contain meat or meat by-products as such and will have a moisture content below about 10% thereby eliminating the need for osmotic agents such as propylene glycol and corn syrup and minimizing the need for other antimicrobials.

BEST MODE FOR CARRYING OUT THE INVENTION

The following examples are presented for the purpose of further illustrating and explaining the present invention and to describe the best mode presently known for carrying it out. These examples are not intended to be taken as limiting in any regard. Unless otherwise indicated, all parts and percentages are based upon the weight of the product or portion thereof at the indicated stage of processing.

EXAMPLE I

This example describes the preparation of two essentially identical products from the following formulation, the only difference being that one is a control product prepared by admixing separately prepared amylolytic digested farinaceous and proteolytic digested proteinaceous slurries, and the other is a product of this invention utilizing a combined enzymatically modified farinaceous and proteinaceous ingredients. The formulation for both is as follows:

| Ingredient | Pounds |
| --- | --- |
| Whole Ground Corn | 27.4 |
| Soybean Meal, 44% protein | 17.7 |
| Whole Ground Wheat | 15.0 |
| Meat & Bone Meal | 12.0 |
| Beef Trims | 10.0 |
| Corn Syrup | 8.0 |
| 1,2-Propanediol | 3.0 |
| Glycerine | 2.0 |
| Vitamin and Mineral Premix | 2.9 |
| Liquid Plant Protease | .2 |
| Bacterial Amylase | .002 |
| Fungal Amylase | .002 |

| Ingredient | Pounds |
| --- | --- |
| Color System | .03 |
| Liquid Coating | 5.0 |

Five pounds of the whole ground corn, having been ground such that 85% passes through a U.S. 20 Mesh Sieve Screen, is added to five pounds of water and the fungal and bacterial amylase in a stirred reactor. The reaction mixtures are heated to 140° F. and held at that temperature for about 30 minutes. To this farinaceous reaction slurry, the propylene glycol, glycerol, trims and 6 pounds of the meat and bone meal are added. The resulting combined reaction slurry is heated to 140° F. and one half of the liquid plant protease is then added. After a reaction time of about 20 minutes, the other half of the liquid plant protease and the meat and bone meal are added for a second period of reaction of about 20 minutes at 140° F. Thereafter, the reaction mixture is heated to 170° F. and held there for 3 minutes to inactivate the enzymes. At this stage, the corn syrup and high fructose corn syrup are added to yield a combined reaction slurry product having a moisture content of 29%.

The resulting combined reaction slurry is then fed into a preconditioner wherein it is combined with all other ingredients except for the remainder of whole ground corn. After a residence time of about 45 seconds at a temperature of about 130° F. in the preconditioner, the preconditioned ingredients are fed to an Anderson expander to which is also fed the remaining whole ground corn. Within the Anderson expander all the ingredients are mechanically worked under heat and pressure to provide a uniform extrudable mass. The temperature within the extruder is maintained at about 265° F. and is extruded through a ⅜ inch hole in a die plate to expand to just less than twice the diameter of the die orifice upon leaving the extruder. A blade, spaced about 3/16 inch from the die plate, intermittently passes the opening in the die plate and severs the product into chunks by a ripping action. The product is cooled to about ambient temperature, coated with about 5% of a liquid coating consisting of bleachable fancy tallow and lipolyzed beef fat tallow, and packaged in moisture proof pouches. The product has a moisture content of about 18% and $a_w$ of about 0.860. This was labelled Product A.

The above process is then repeated except that a separate farinaceous slurry of five pounds of whole ground corn having been ground such that 85% passes through a U.S. 20 mesh sieve screen, is added to five pound of water and the fungal and bacterial amylase in a stirred reaction. A separate proteinaceous meaty slurry of all of the proteinaceous materials, liquid plant protease, the propylene glycol, glycerol, trims and processing water is added in a stirred reactor. Both processes are heated to 140° F. and held for about 35 minutes. Thereafter, each reaction mixture is heated to 170° F. and held for 3 minutes to inactivate the enzymes. The two separate reaction slurries are thereafter combined and the remaining procedure according to Example 1 is employed. This was labelled Product B.

These two products are then fed to 21 dogs for four days according to the following this test procedure. The test showed that the product prepared with the combined reaction slurry (Product A) was significantly preferred to that employing the two separate reaction slurries (Product B) at a confidence level of 99%. Thus when the canine testing panel was given the choice between A and B products, the dogs consumed at least three times the amount of A as compared with B.

EXAMPLE II

This example illustrates the preparation of a dry dog food product essentially in accordance with the above description except that formulation indicated below is employed and for the process is modified as follows:

| Ingredient | Pounds |
| --- | --- |
| Whole Ground Corn | 54.1 |
| Whole Ground Wheat | 15.0 |
| Meat & Bone Meal | 14.8 |
| Soybean Meal, 44% protein | 12.0 |
| Vitamin & Mineral Premix | 2.1 |
| Liquid Plant Protease | 0.2 |
| Bacterial Amylase | 0.02 |
| Fungal Amylase | 0.02 |
| Color System | .02 |
| Liquid Coating | 5.0 |

The process differs in that five pounds of the corn and one half of the meat and bone meal are combined with an equal amount of water and one half of the protease and all of the bacterial and fungal amylases in a stirred reactor. The reaction mixture is heated to about 160° F. and held at that temperature for about 50 minutes. The remaining meat and bone meal and protease are added to the reaction mixture for approximately 40 minutes at 150° F. Thereafter, the reaction mixture is heated to 175° F. and held 3 minutes to inactivate the enzymes. The procedure of Example 1 is thereafter employed.

The above description is for the purpose of teaching those skilled in the art how to practice the present invention and is not intended to recite all the possible modifications and variations thereof which will become apparent to the skilled worker upon reading. It is intended, however, that all such modifications and variations be included within the scope of the invention which is defined by the following claims.

What is claimed:

1. A process for preparing a nutritionally-balanced dog food having improved palatability, said dog food comprising fat, protein, carbohydrates, vitamins and minerals and containing of a weight basis from 20% to 80% farinaceous ingredients and from 20% to 80% proteinaceous ingredients, including proteinaceous meaty material at from about 25% to about 55% by weight of the proteinaceous ingredients, said process comprising the steps of:
(a) preparing a slurry comprising water, from about 5% to about 25% of the total weight of said farinaceous ingredients, and a major portion of the proteinaceous meaty material;
(b) forming a reaction product by treating said slurry with added alpha-amylase and added protease enzymes in an amount and under conditions effective to convert at least a portion of the farinaceous material to a mixture of oligo saccharides ranging in size from 1 to 10 monomer units, and at least a portion of the proteinaceous material to a mixture of peptides ranging in size from 2 to 300 monomer units, and effective to reduce the viscosity of the slurry by 50%; and thereafter,
(c) incorporating the reaction product of the slurry into a dog food in an amount effective to provide a significant increase in the palatability of the dog food to dogs.

2. A process according to claim 1 wherein the farinaceous and proteinaceous reaction products are admixed with the remaining proteinaceous and farinaceous ingredients to form a plastic mass which is mechanically worked under elevated temperature and pressure, and is then forced through an orifice to an area of pressure sufficiently low to cause flashing of moisture and expansion of the mass.

3. A process according to claim 1 wherein the reaction product is incorporated into the dog food by coating it on the surface thereof.

4. A process according to claim 1 wherein the dog food is dried to a moisture content of less than 10%.

5. A process according to claim 1 wherein the dog food has a moisture content in excess of 10%.

6. A process according to claim 5 wherein the dog food comprises from about 12% to about 20% moisture and contains sufficient levels of osmotic and antimicrobial agents to maintain it stable against microbial deterioration when stored in moisture-impermeable packages.

7. A process according to claim 6 wherein the proteolytic enzyme is employed in an amount sufficient to provide peptides ranging in size from 2 to 50 monomer units.

8. A process according to claim 1 wherein said proteinaceous meaty material comprises meat meal.

9. A process according to claim 1 wherein the water in said slurry comprises from about 30% to about 70% of the slurry.

10. A process according to claim 1 wherein the slurry comprises corn.

11. A process according to claim 10 wherein the slurry further comprises wheat.

12. A process according to claim 1 wherein all of the enzymes are heat labile and the process includes the further step of heating the reaction product to a temperature effective to inactivate the enzymes.

13. A process according to claim 12 wherein the farinaceous ingredients present in the slurry comprise from 60% to 80% by weight of wheat and from 20% to 40% by weight of corn.

14. A process according to claim 13 wherein the proteinaceous ingredients comprise from about 10% to about 40% by weight of the dog food of soybean meal.

15. A process according to claim 14 wherein the amylase enzyme comprises about one-half bacterial alpha-amylase and one-half fungal alpha-amylase.

16. A process according to claim 15 wherein the viscosity of the slurry is reduced to 25% of the original viscosity.

17. A nutritionally-balanced dog food of improved palatability prepared according to the process of claim 1.

* * * * *